US012774237B2

(12) United States Patent
Musale et al.

(10) Patent No.: US 12,774,237 B2
(45) **Date of Patent: *Oct. 27, 2026**

(54) INTEGRATED METHOD AND APPARATUS FOR TREATMENT OF PRODUCED WATER

(71) Applicant: TETRA Technologies, Inc., Spring, TX (US)

(72) Inventors: Deepak Musale, Spring, TX (US); Adam Calvin, Spring, TX (US); Yannick Harvey, Spring, TX (US); Arthur Mack, Spring, TX (US); Stanley Gunawan, Spring, TX (US)

(73) Assignee: TETRA Technologies, Inc., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/452,670

(22) Filed: Jan. 19, 2026

(65) Prior Publication Data

US 2026/0285726 A1 Sep. 24, 2026

Related U.S. Application Data

(63) Continuation-in-part of application No. PCT/US2025/059408, filed on Dec. 12, 2025, and a (Continued)

(51) Int. Cl.
*C02F 9/00* (2023.01)
*C02F 1/28* (2023.01)

(Continued)

(52) U.S. Cl.
CPC .................. *C02F 9/00* (2013.01); *C02F 1/28* (2013.01); *C02F 1/32* (2013.01); *C02F 1/441* (2013.01);

(Continued)

(58) Field of Classification Search
CPC .. C02F 9/00; C02F 2101/108; C02F 2101/16; C02F 2101/20; C02F 2101/322;

(Continued)

(56) References Cited

U.S. PATENT DOCUMENTS 6,663,778 B1 * 12/2003 Bader ........................ C02F 1/54 210/729
6,716,355 B1 * 4/2004 Hanemaaijer ........ B01D 63/043 203/25

(Continued)

FOREIGN PATENT DOCUMENTS

WO WO2017136048 A2 8/2017

*Primary Examiner* — Joseph W Drodge

(74) *Attorney, Agent, or Firm* — Roy Kiesel Ford Doody & North, APLC; Brett A. North

(57) ABSTRACT

Integrated processes for the treatment of produced water, including for example treatment in connection with hydrocarbon production operations using bulk solid-liquid separation, organics removal, and desalination by osmotically assisted reverse osmosis (OARO) and/or vacuum membrane distillation (VMD). Various pretreatment technologies including without limitation pH adjustment, oxidant addition, particle removal, oxidant removal, followed by OARO and/or VMD, may be combined with a subsequent polishing process of the desalinated produced water such as to remove ammonia, boron, heavy metals, and/or organics. Water to be treated may be produced water that has been pumped from a subterranean reservoir. The treated water may be sent for beneficial reuse which includes without limitation different fit-for purpose applications including those outside oil and gas industry at a low cost.

29 Claims, 6 Drawing Sheets

Related U.S. Application Data continuation-in-part of application No. 19/082,480, filed on Mar. 18, 2025, now Pat. No. 12,528,727.

(51) Int. Cl.

| | |
|---|---|
| ***C02F 1/32*** | (2023.01) |
| ***C02F 1/72*** | (2023.01) |
| *C02F 1/44* | (2023.01) |
| *C02F 101/20* | (2006.01) |
| *C02F 101/32* | (2006.01) |
| *C02F 103/36* | (2006.01) |

(52) U.S. Cl.

CPC .............. *C02F 1/444* (2013.01); *C02F 1/447* (2013.01); *C02F 1/72* (2013.01); *C02F 2101/20* (2013.01); *C02F 2101/322* (2013.01); *C02F 2103/36* (2013.01); *C02F 2201/005* (2013.01); *C02F 2209/03* (2013.01); *C02F 2209/10* (2013.01); *C02F 2209/40* (2013.01); *C02F 2303/04* (2013.01); *C02F 2303/08* (2013.01); *C02F 2303/22* (2013.01)

(58) Field of Classification Search

CPC .............. C02F 2103/08; C02F 2103/34; C02F 2209/06; C02F 2209/10; C02F 2305/023; C02F 1/28; C02F 1/281; C02F 1/285; C02F 1/288; C02F 1/32; C02F 1/44; C02F 1/441; C02F 1/444; C02F 1/445; C02F 1/447; C02F 1/72; C02F 1/722; C02F 1/727; C02F 1/76; C02F 1/766; C02F 1/78; C02F 2103/365; C02F 2103/36; C02F 2201/005; C02F 2209/03; C02F 2209/40; C02F 2303/04; C02F 2303/08; C02F 2303/22; C02F 2201/004; C02F 2303/16; B01D 61/002; B01D 61/0021; B01D 61/02; B01D 61/025; B01D 61/026; B01D 61/029; B01D 61/04; B01D 61/14; B01D 61/147; B01D 61/16; B01D 61/36; B01D 61/364; B01D 61/58; B01D 2221/04; B01D 2311/04; B01D 2311/06; B01D 2311/2626; B01D 2311/2634; B01D 2311/2669; E21B 21/06; E21B 21/063; E21B 21/065; E21B 21/066; E21B 43/34; E21B 43/35; E21B 43/40

See application file for complete search history.

(56) References Cited

U.S. PATENT DOCUMENTS

| | | | | |
|---|---|---|---|---|
| 7,392,848 | B1 * | 7/2008 | Bader | E21B 43/20<br>166/371 |
| 9,180,411 | B2 * | 11/2015 | Prakash | C02F 1/463 |
| 9,206,060 | B1 * | 12/2015 | Abusharkh | B01D 61/026 |
| 9,427,705 | B1 * | 8/2016 | Abusharkh | C02F 1/5281 |
| 9,446,974 | B2 * | 9/2016 | Milner | C02F 1/4672 |
| 9,604,178 | B1 * | 3/2017 | Bharwada | C02F 1/442 |
| 9,751,777 | B1 * | 9/2017 | Bader | C02F 1/40 |
| 9,815,031 | B2 * | 11/2017 | Berzinis | B01D 69/06 |
| 9,896,348 | B2 * | 2/2018 | Bromley | C02F 1/442 |
| 9,932,257 | B2 * | 4/2018 | Prakash | B01D 61/025 |
| 10,399,880 | B2 * | 9/2019 | Prakash | B01D 61/58 |
| 10,464,831 | B1 * | 11/2019 | Bader | C07C 211/03 |
| 11,230,480 | B2 * | 1/2022 | Ghaffour | C02F 1/447 |
| 11,685,678 | B2 * | 6/2023 | Nap | C02F 9/00<br>210/703 |
| 2007/0102359 | A1 * | 5/2007 | Lombardi | B01D 61/04<br>210/764 |
| 2013/0075333 | A1 * | 3/2013 | Pruet | B01D 71/024<br>210/640 |
| 2013/0075334 | A1 * | 3/2013 | Prakash | B01D 61/58<br>210/640 |
| 2013/0075335 | A1 * | 3/2013 | Prakash | B01D 61/58<br>210/640 |
| 2013/0153497 | A1 | 6/2013 | Arafat | |
| 2013/0255955 | A1 * | 10/2013 | Curole | B01D 61/027<br>166/52 |
| 2017/0081227 | A1 * | 3/2017 | Riffe | C02F 9/00 |
| 2017/0158526 | A1 * | 6/2017 | Matza | C02F 1/004 |
| 2017/0349467 | A1 * | 12/2017 | Blohm | B01D 61/002 |
| 2019/0248689 | A1 * | 8/2019 | Miller | C02F 1/441 |
| 2021/0198136 | A1 * | 7/2021 | Jani | B01D 61/029 |
| 2021/0363032 | A1 * | 11/2021 | Raynel | B01D 61/0271 |
| 2022/0008867 | A1 * | 1/2022 | Rahaman | B01D 71/56 |
| 2022/0080358 | A1 * | 3/2022 | Hashimoto | C02F 1/447 |
| 2024/0116001 | A1 * | 4/2024 | Bromley | B01D 65/02 |
| 2025/0025838 | A1 * | 1/2025 | Sadr Ghayeni | B01D 63/02 |

* cited by examiner

INTEGRATED METHOD AND APPARATUS FOR TREATMENT OF PRODUCED WATER

CROSS-REFERENCE TO RELATED APPLICATIONS

This is a continuation-in-part of pending US full utility patent application Ser. No. 19/082,480, filed on Mar. 18, 2025 (and issuing as U.S. Pat. No. 12,528,727 on Jan. 20, 2026), the entirety of such application is incorporated herein by reference and priority of/to such application is hereby claimed. This is also a continuation-in-part of pending Patent Cooperation Treaty patent application serial no. PCT/US25/59408, filed on Dec. 12, 2025, the entirety of such application is incorporated herein by reference and priority of/to such application is hereby claimed.

BACKGROUND OF THE INVENTION

In the oil and gas industry, water that is drawn from the formation is referred to as "produced water" and is a significant challenge because it contains high levels or concentrations of salts, hydrocarbons, heavy metals, and other contaminants that may need to be treated and/or removed before the produced water is disposed of or reused. Produced waters compositions can vary significantly depending on factors such as reservoir characteristics, well location, and/or production techniques. Produced waters can contain a wide range of contaminants, including dissolved and suspended solids, hydrocarbons, heavy metals, and/or chemicals used in the production process. The concentrations and types of contaminants can differ from one well to another. For every barrel of crude oil produced, about three to ten barrels of water is produced. Globally generated produced water volumes are very large and subsurface disposal methods may likely contribute to unwanted seismic activity.

Treatment and reuse of produced water are important strategies that address the dual challenges of water scarcity and challenges posed by produced water production. There is a need for treating produced waters sufficiently so that these waters can be safely used for other purposes like agriculture, etc. There is a need for commercially feasible desalination methods of treating produced water that reduce reliance on discharge to subsurface reservoirs, reduce transportation and disposal costs, and use low energy desalination methods.

An integrated treatment process allows for the customization of treatment methods to effectively remove specific contaminants present in the produced water. An integrated process to treat produced waters generated during oil and gas production is needed because produced water composition can vary significantly depending on factors such as the reservoir characteristics, well location, and production techniques.

Produced water often contains residual hydrocarbons, including oil and grease. These hydrocarbons can be present in the form of free oil, dispersed oil droplets, and/or emulsions. Treating produced water to remove hydrocarbons can be necessary to meet environmental regulations, ensure proper disposal or reuse, and/or reducing fouling of desalination equipment used to treat the produced water. An integrated treatment process can incorporate techniques like dissolved air flotation, gravity separation, and/or membrane filtration to effectively separate and remove hydrocarbons from the produced water.

Produced water may contain minerals and ions that can lead to scale formation and corrosion in the desalination equipment, pipelines and/or equipment. Scaling and corrosion can impair production efficiency and/or cause damage to infrastructure. An integrated treatment process can include chemical dosing, softening by chemicals or ion exchange to control scaling and corrosion, thereby ensuring the longevity and integrity of production facilities.

Salinity is an important parameter in produced water treatment. The salt content of produced water can range from low to very high, depending on the reservoir characteristics. High salinity levels can pose challenges for conventional treatment methods such as reverse osmosis or electrodialysis, to achieve the desired water quality. An integrated approach allows for the selection and combination of treatment technologies based on the salinity levels of the produced water.

Conventional desalination processes for beneficial reuse of produced waters disadvantageously fail to satisfactorily treat to desired concentration levels and/or require too much energy for treatments. Conventional reverse osmosis ("RO") technology can be suitable for treating produces waters with salt concentrations of less than 35-45K mg/L. Thermal distillation treatment technologies, while capable of treating much higher salt concentrations, require high amounts of input energy and are very expensive to install and operate.

Low-energy desalination of produced water comprises the process of removing dissolved salts and other impurities using methods requiring only minimal energy inputs. Two low-cost low energy desalination treatment processes for produced waters are: (a) osmotically assisted reverse osmosis treatment ("OARO") and/or (b) vacuum membrane distillation ("VMD"). OARO and/or VMD have not been applied to produced waters desalination on a commercial scale. OARO combines the principles of forward osmosis and reverse osmosis to achieve desalination with reduced energy requirements. VMD is a thermal desalination process that utilizes vapor pressure difference across the hydrophobic membrane to vaporize water at lower temperatures than other thermal desalination processes.

Each of these treatment processes use membranes of various types. Such membranes are highly susceptible to degradation and/or fouling by various contaminants contained in produced waters. Accordingly, prior to treatment by OARO and/or VMD, the quality of produced waters with dissolved salts should be such that their treatment membranes have a long useful life before requiring replacement.

Evaluation of the effectiveness of various membrane cleaning techniques for removing fouling from membranes has been made along with investigating the integration of various pre-treatment steps in connection with reducing membrane fouling and/or improving overall system performance.

Pretreatment of produced waters using conventional dissolved air flotation ("DAF") systems in combination with conventional filtration many times fails to provide the required quality for such pre-treated produced waters before desalination treatment by OARO and/or VMD.

Various causes of membrane fouling have been investigated for desalination systems along with different methods of mitigation and/or prevention of membrane fouling. Various potential foulants present in produced waters have been identified and their interactions with membranes have been investigated. Various operating parameters for membrane fouling have been investigated and/or strategies developed for optimizing said parameters.

Low-energy desalination of produced waters refers to the use of desalination techniques that require minimal net energy input to remove dissolved salts and other impurities from water generated as a byproduct of oil and gas production. It is needed for energy efficiency, cost reduction, environmental sustainability, resource conservation, and/or regulatory compliance.

Various embodiments provide a unique integration of multiple pre-treatment stages with OARO and/or VMD desalination of produced waters. The integrated approach can be applicable to a wide variety of produced water types.

OARO: Osmotically Assisted Reverse Osmosis, which can include:
- (i) Counterflow Reverse Osmosis (CFRO);
- (ii) Cascading Osmotically Mediated Reverse Osmosis (COMRO; and/or
- (iii) Osmotically Enhanced Dewatering-Reverse Osmosis (OED-RO).

PAFO: Pressure Assisted Forward Osmosis
FO: Forward Osmosis
RO: Reverse Osmosis
RSL: Regenerable Surface Layer Membranes
VMD: Vacuum Membrane Distillation which can include:
DCMD: Direct Contact Membrane Distillation;
AGMD: Air-Gap Membrane Distillation; and/or other variations of Membrane Distillation like Vacuum Assisted Air-Gap Membrane Distillation.
UF: Ultrafiltration which can include microfiltration (MF)

An integrated treatment process enables optimization of the overall treatment scheme. By considering the unique characteristics of the produced water, treatment technologies can be combined in a sequential manner to maximize treatment efficiency and/or minimize energy consumption. Process optimization ensures that the treatment process is cost-effective and achieves the desired water quality objectives.

Depending on the treated water quality and local regulations, treated PW can be reused for various purposes, such as irrigation, industrial processes, and/or hydraulic fracturing operations. However, the suitability of treated produced water for reuse depends on its specific characteristics and/or the intended application. An integrated treatment process allows for the customization of treatment methods to meet the water quality requirements for different reuse or disposal options.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

SUMMARY OF THE INVENTION

The apparatus of the present invention solves the problems confronted in the art in a simple and straightforward manner.

Various embodiments include an integrated process and apparatus to treat produced water (PW) generated during oil and gas production, comprising the steps of:
- (a) removal of heavy metals, oil and grease, and/or $H_2S$;
- (b) removal of suspended solids; and/or
- (c) removal of water-soluble organics; and/or

- (d) removal of fine particles including microorganisms; and/or
- (e) removal/neutralization of residual oxidants; and/or
- (f) further optional disinfection; and/or
- (g) desalination using OARO and/or VMD; and/or
- (h) optional removal of residual organics and ammonia from desalinated water stream.

Various embodiments allow the beneficial reuse of produced water for different fit-for purpose applications including those outside oil and gas industry at a low cost.

In various embodiments is provided a method and apparatus that integrates various pre-treatment techniques of produced water with OARO and/or VMD of the pre-treated produced water to achieve Low Energy Desalination (LED) of the produced water for beneficial reuse.

Various embodiments facilitate the desalination of hypersaline produced water streams, that either: (a) not possible with conventional seawater reverse osmosis desalination systems due to osmotic pressure limitations and/or (b) energy intensive in case of thermal technologies which can desalinate hypersaline waters.

An integrated process of treating produced waters is desired as being capable of treating produced waters having large variations in composition. An integrated approach allows for the selection and combination of treatment technologies based on the salinity levels of the produced water. An integrated treatment process allows for the customization of treatment methods to effectively remove specific contaminants present in produced waters.

Varying Contaminant Levels:

Produced waters can contain a wide range of contaminants, including dissolved and suspended solids, hydrocarbons, heavy metals, and/or chemicals used in the production process. The concentrations and types of contaminants can differ from one well to another.

Salinity Levels:

Salinity is an important parameter in produced water treatment. The salt content of produced water can range from low to very high, depending on the reservoir characteristics.

High salinity levels can pose challenges for conventional treatment methods such as reverse osmosis or electrodialysis, to achieve the desired water quality.

Hydrocarbon Removal:

Produced waters often contains residual hydrocarbons, including oil and grease. These hydrocarbons can be present in the form of free oil, dispersed oil droplets, and/or emulsions. Treating produced waters to remove hydrocarbons is important to meet environmental regulations, to ensure proper disposal or safety when reused, and/or to reduce fouling of membranes.

Various embodiments can include gravity separation, dissolved air flotation, and/or membrane filtration to effectively separate and remove hydrocarbons.

Scale and Corrosion Control:

Produced waters may contain minerals and ions leading to scaling and corrosion in the desalination equipment, pipelines, and/or other equipment. Scaling and corrosion can impair production efficiency and/or damage infrastructure.

Various embodiments can include chemical dosing and/or softening by chemicals or ion exchange that can control scaling and corrosion, along with ensuring the longevity and integrity of production facilities.

Reuse and Disposal Options:

Depending on the composition of the produced waters to be treated and local regulations, produced waters after treatment can be reused for various purposes, including but not limited to irrigation, industrial processes, and/or hydraulic fracturing operations.

Suitability of produced waters after treatment for reuse depends on its specific characteristics and the intended application.

An integrated treatment process allows for the customization of treatment methods to meet the water quality requirements for different reuse or disposal options.

Process Optimization:

An integrated treatment process enables optimization of the overall treatment scheme. By considering the unique characteristics of the produced waters, treatment technologies can be combined in a sequential manner to maximize treatment efficiency and/or minimize energy consumption.

Optimization can ensure that the overall treatment process for the produced waters is cost-effective and achieves the desired water quality objectives.

Advantages

Use of low energy desalination process reduces the overall energy consumption for treating produced waters. Low energy desalination processes are more environmentally friendly compared to traditional methods, as they require less power, produce fewer greenhouse gas emissions, can lead to cost savings, and improve the sustainability of water treatment operations by minimizing their carbon footprint.

An OARO system can effectively treat or desalinate of hypersaline produces waters. Additionally, because the process does not require a phase change (e.g., in distillation processes) and further the osmotic assistance reduces the amount of electricity for treatment, this treatment process will be of lower energy and associated lower emissions.

Compared to other thermal desalination processes, a VMD system consumes much less power due to the vacuum causing water to vaporize at or below 100° C.; which allows for potential low-grade heat scavenging operations.

The drawings constitute a part of this specification and include exemplary embodiments to the invention, which may be embodied in various forms.

BRIEF DESCRIPTION OF DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
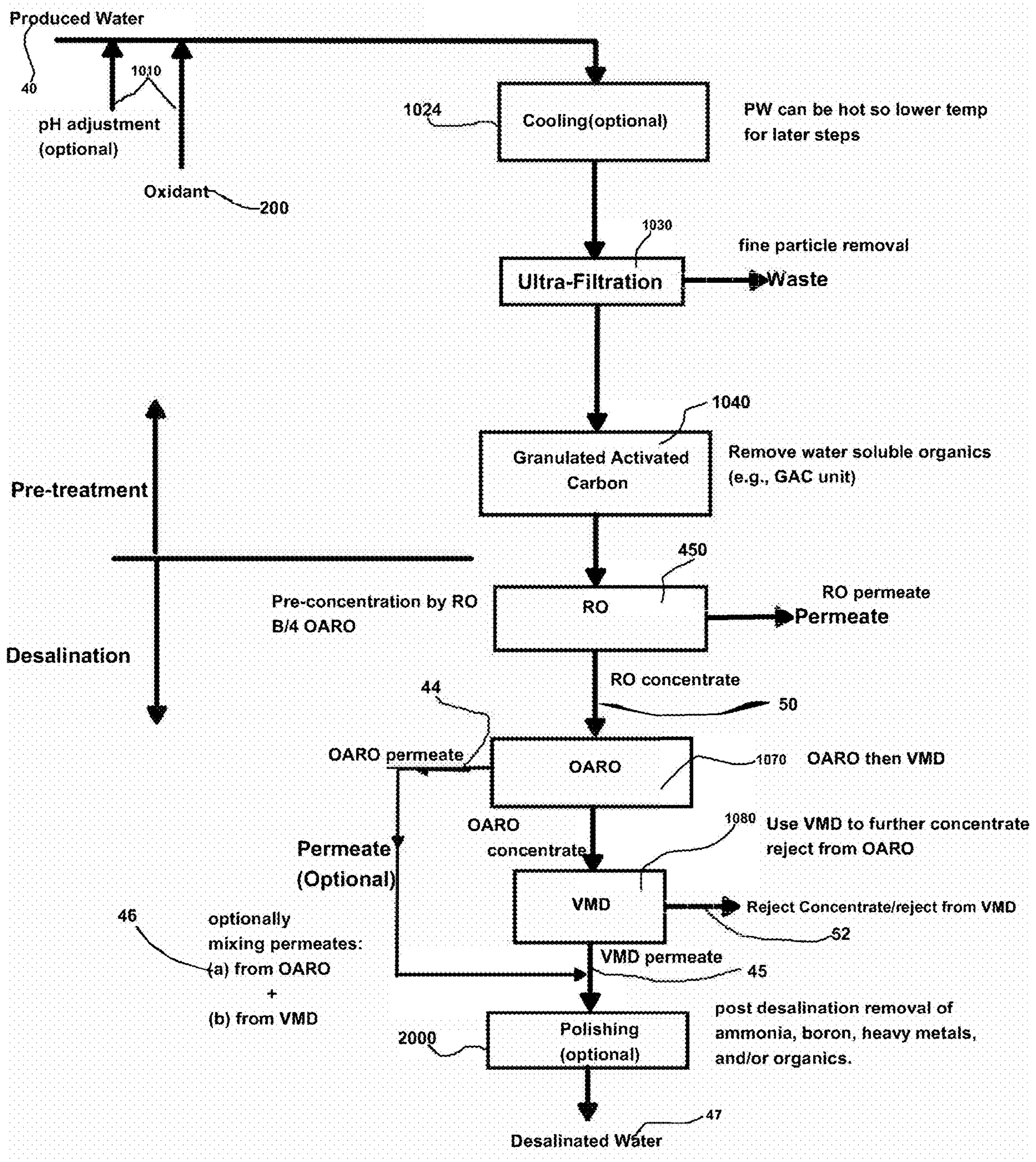
FIG. 1 is a schematic diagram of one embodiment of the method and apparatus.

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Embodiments will now be described in detail to provide an overall understanding of the principles of the structure, function, manufacture, and use of the devices and methods disclosed herein. Those skilled in the art will understand that the systems and methods specifically described herein and illustrated in the accompanying drawings are non-limiting exemplary embodiments and that the scope of the present disclosure is further defined by the claims. The features illustrated or described in connection with one exemplary embodiment may be combined with the features of other embodiments. Such modifications and variations are intended to be included within the scope of the present disclosure. Terms commonly known to those skilled in the art for components and/or processes of the systems, methods, and compositions disclosed herein and the like may be used interchangeably herein. For example, the architectures, and/or aspects of the embodiments presented in this disclosure, may be referred to by those skilled in the art as "feed and bleed" (semi-batch) and/or "batch" architectures. Such architectures may contain a recirculation loop on a permeate stream, as discussed in detail below. Moreover, the terms "waste" and "brine" can be used interchangeably to refer to the non-product stream that flows out of each step in the process.

When accommodating the various embodiments of the present disclosure to different desalinated water streams use requirements (i.e., livestock feeding, crop growing, Artificial Intelligence and data center cooling, rangeland irrigation, fire control, power generation, and ecological needs), said embodiments may be presented in different scales: batch and feed and bleed (or semi-batch). Embodiments of the batch methods disclosed herein, generally rely on cycling the produced water from a single tank or multiple tanks isolated from the source generating the produced water. While recirculating produced water through any method is energetically inefficient due to pumping losses, batch methods disclosed herein are generally less expensive at small production volumes at least because one can control the input stream of produced water which may in turn, reduce any membrane requirements and will therefore translate in less capital. On the other hand, feed and bleed systems may only need input of produced water stream (generally directly connected to the well generating the produced water) and thereby setup to constantly add and remove. Unlike batch, continuous is more energy efficient, but is more expensive in terms of initial capital cost, at least because more membranes may be needed to remove the same amount of solids as a batch system.

Batch architectures are more common for situations where direct connection to the oil well is not required or difficult to achieve, and thereby often provide for lower capital costs and provides for more flexibility. In contrast, feed and bleed setups of the embodiments presented herein, are more common for larger-scale situations, often because they can run continuously and may be setup to handle more throughput. Generally, with a feed and bleed system there are savings on the liquid feed side in the form of less tanks and equipment. However, embodiments of the feed and bleed systems presented herein, may tend to operate at a higher salinity (versus cycling from low to high TDS in batch). This can result in lower flux and require more OARO and/or VMD membranes per unit of throughput. In broad terms, the selection between these methods considers the unique characteristics of the produced water streams, any desalinated water stream output requirements, and treatment technologies (i.e., Ultra-filtration, OARO, RO, VMD, etc.) to optimize cost and energy consumption. More specific thresholds may also be used to determine the applicability of a feed and bleed versus the semi-batch systems as disclosed herein. Embodiments of the present disclosure can be used in semi-batch for 2,500 gallons (9,464 liters) or less, while the larger scale, feed and bleed systems with which continuous architectures may be used for approximately 10,000 gallons (37,854 liters) or more output of desalinated water streams. These thresholds were determined from multiple optimizations of the disclosed embodiments that maximize the daily desalinated water stream volumes while minimizing the capital cost of the system across a range of design requirements. Nonetheless, a system between these two ranges can be either batch or continuous, with other tradeoffs between the technologies being case specific. For example, a continuous system or batch system may occupy different volumes of space, with a batch system using more valves and auxiliary components. These factors can be additional considerations in this intermediary range beyond just measures of output requirements, salinity specifications, capital expenditure, among others.

Figure 2A:
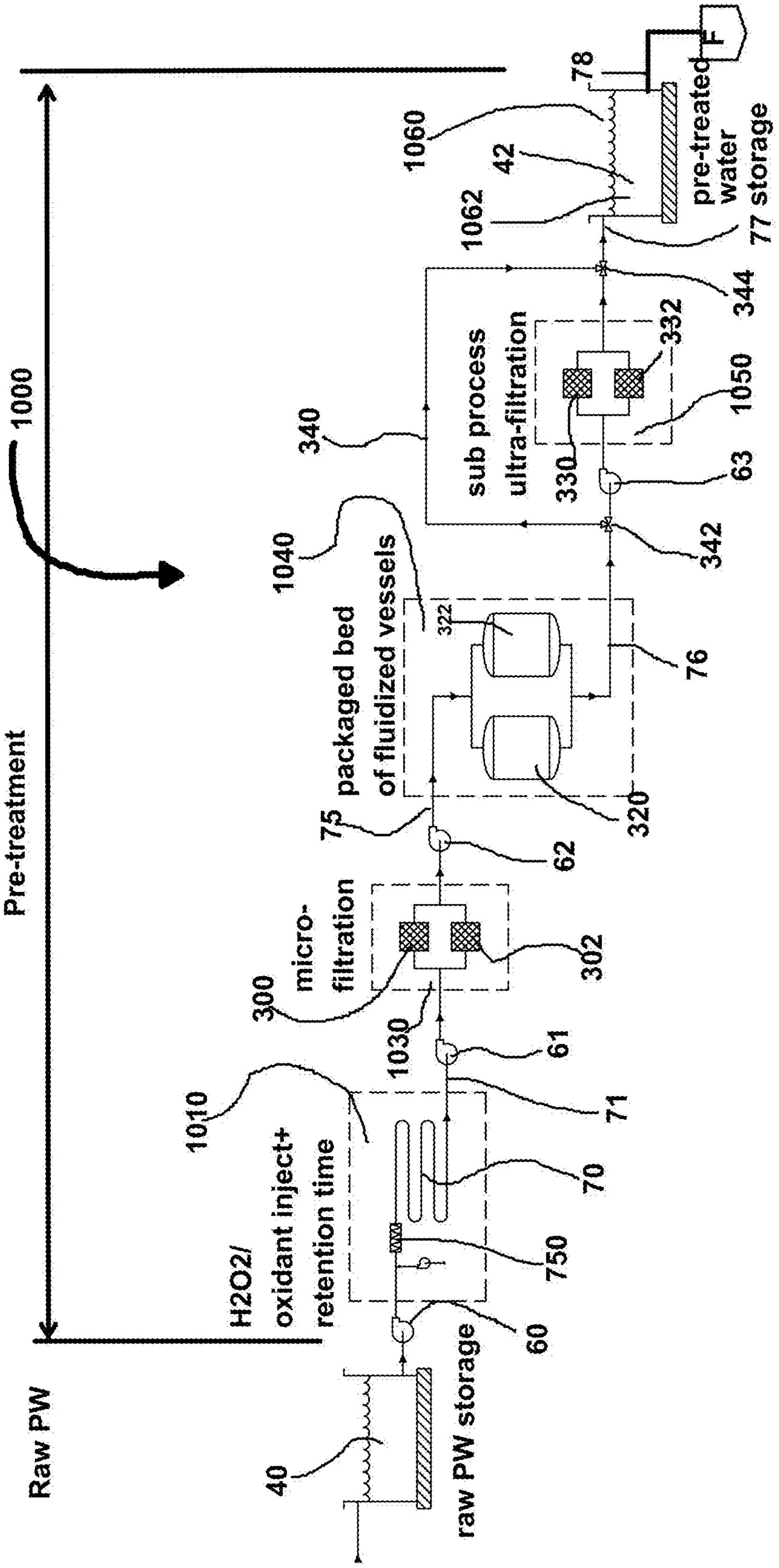
FIGS. 2A and 2B show one embodiment of an apparatus which can be used to practice the method of FIG. 1.
Figure 2B:
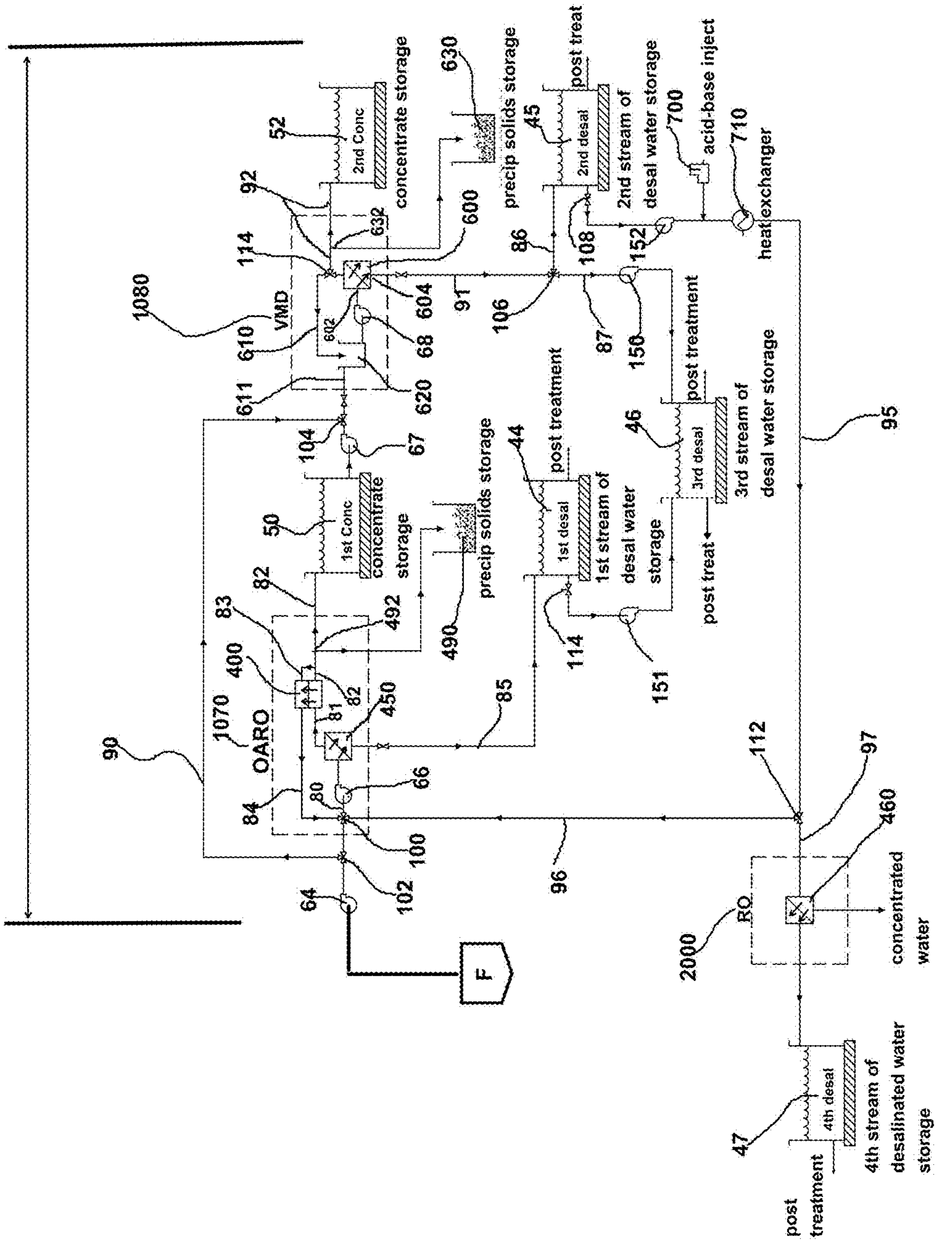
Figure 3A:
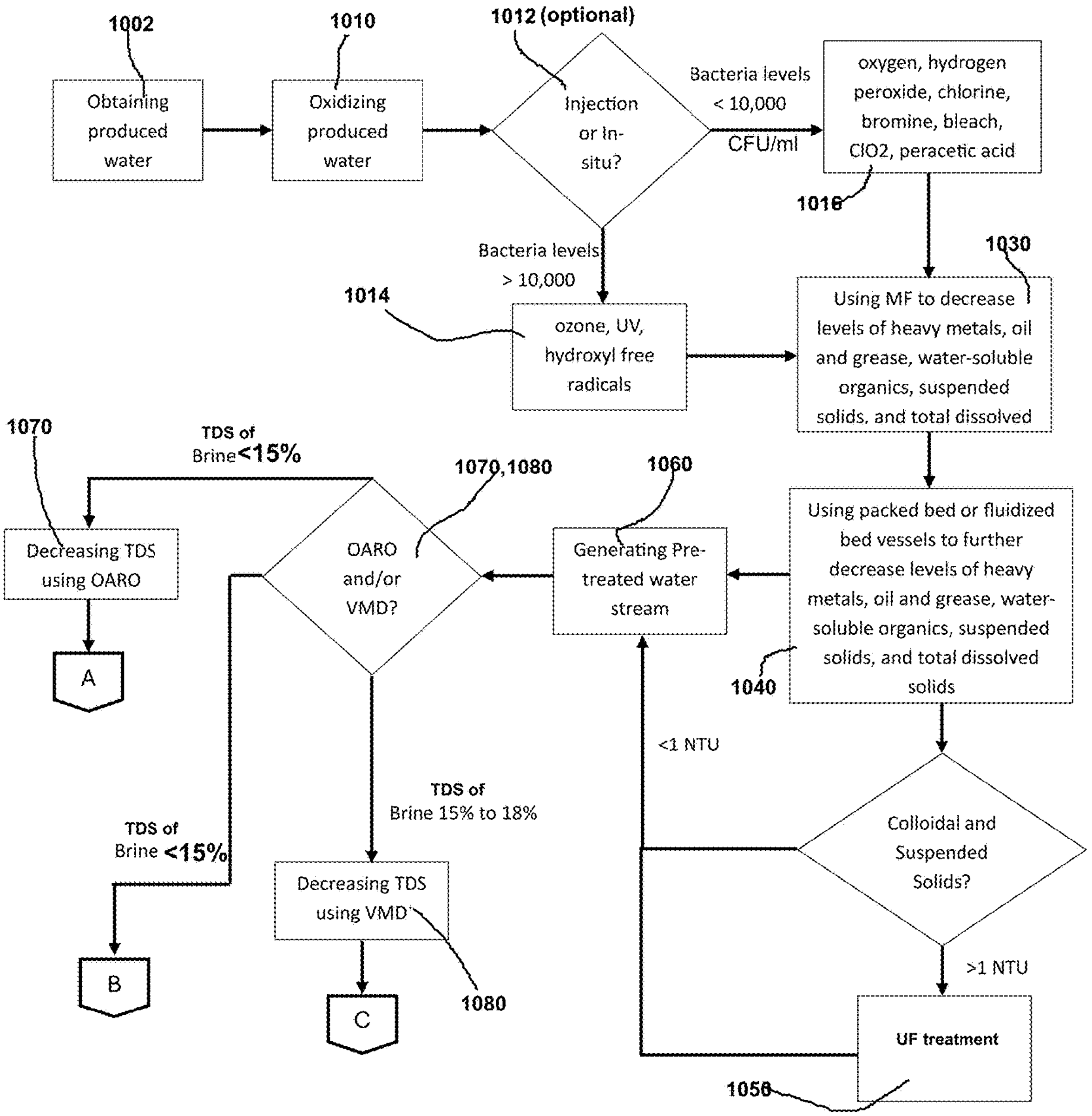
FIGS. 3A, 3B, and 3C are a flow chart of one embodiment of the method and apparatus.
Figure 3B:
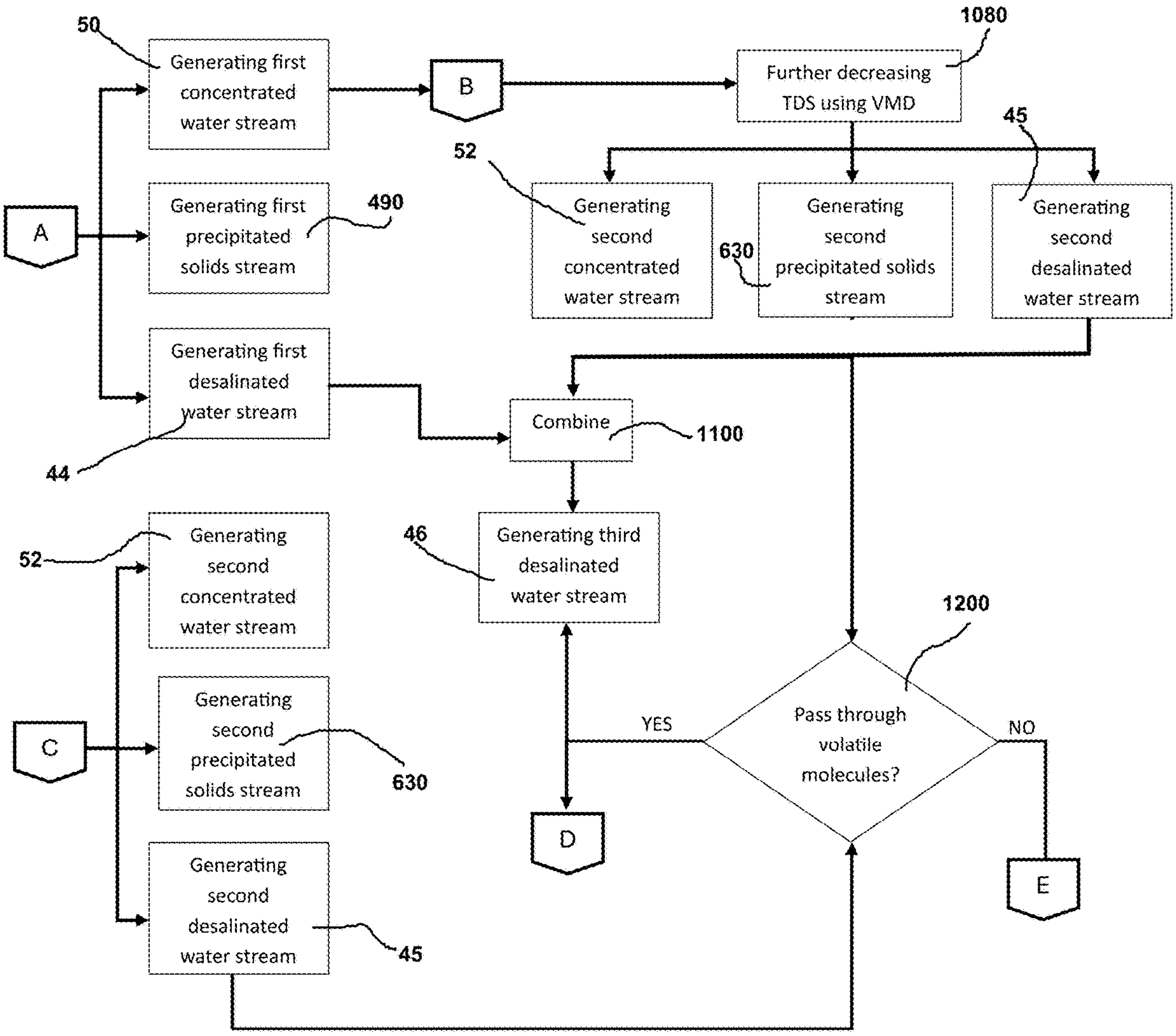
Figure 3C:
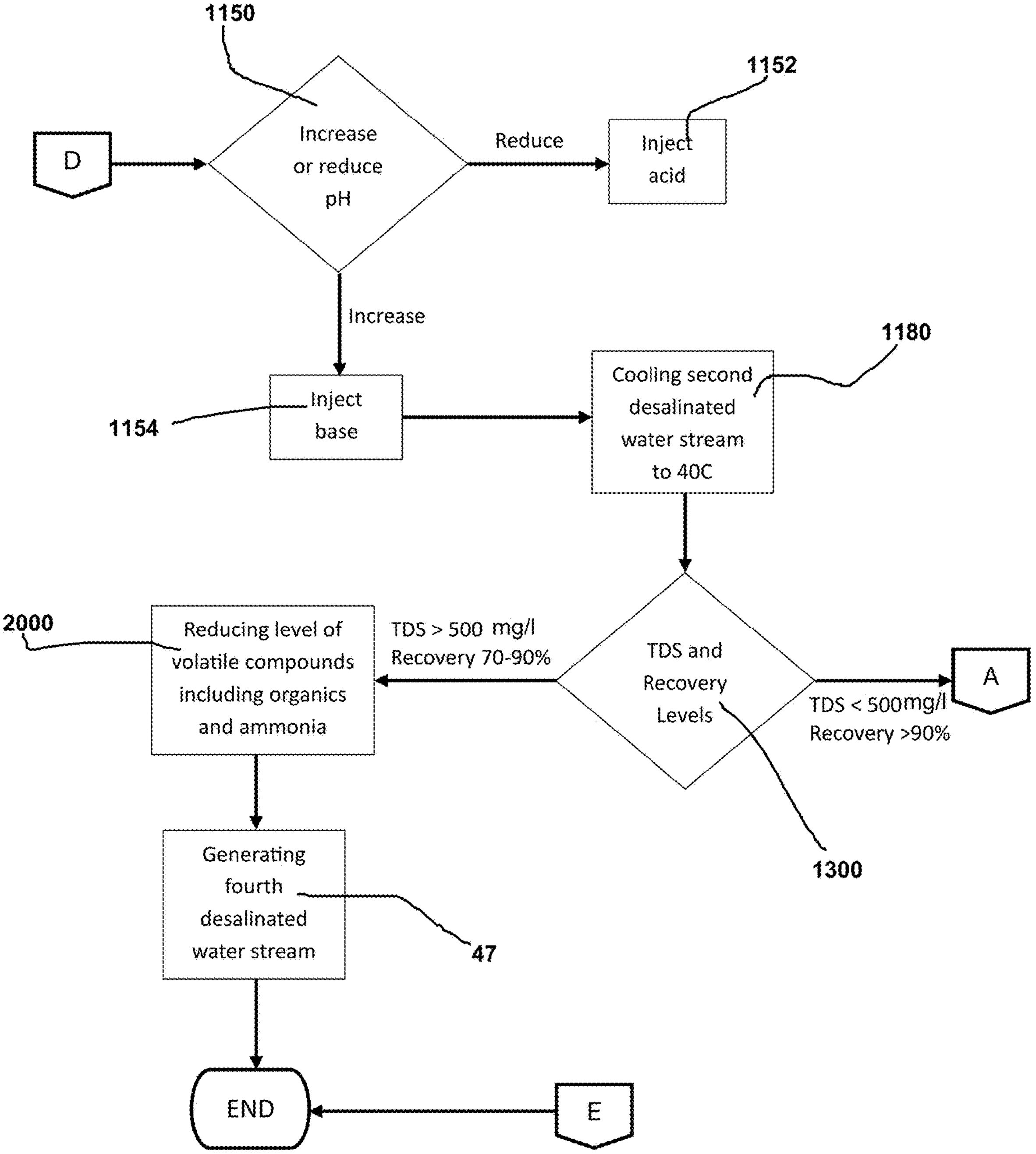

FIG. 1 is a schematic diagram of one embodiment of the method and apparatus 1000. FIGS. 2A and 2B shows one embodiment of an apparatus which can be used to practice the method and apparatus. FIGS. 3A, 3B, and 3C are a flow chart of one embodiment of the method and apparatus.

One embodiment of includes a method and apparatus 1000 to treat produced water 40 generated during oil and gas production for desalinating water, comprising the steps of:

- Step 1002 of obtaining produced water including heavy metals, oil and grease, water soluble organics, suspended solids, and total dissolved solids comprising one or more salts;
- Step 1010 wherein after step 1002, decreasing levels of the heavy metals to below 10 ppm and/or decreasing levels of oil and grease in the produced water to below 100 ppm by treating the produced waters with a treatment selected from the group consisting of: adjusting the pH of the produced water, introduction of an oxidizer to the produced water, and a combination thereof;
- Step 1012 wherein, optionally after step 1002, decreasing levels of oxidants in the produced water to below 100 ppm using a treatment selected from the group consisting of: absorbents, adsorbents, and a combination thereof;
- Step 1030 wherein after step 1002, decreasing levels of the suspended solids in the produced water to below 50 ppm using a membrane coated having a regenerable surface layer selected from the group consisting of: metal oxide powder, aluminosilicates, aluminum oxides, iron oxides, powdered activated carbon, clays, polymeric sorbents, catalysts, and combination thereof;
- Step 1040 wherein after step 1002, decreasing levels of the water-soluble organics in the produced water to below 10 ppm using a treatment selected from the group consisting of: absorbents, and adsorbents, and combinations thereof;
- Step 1050 wherein the removal of residual suspended and colloidal solids from the fluid via ultrafiltration. This step may be avoided depending on the condition of the produced fluid leaving step 1030 and/or 1040, particularly when turbidity values are less than 1 NTU.
- Steps 1070 and/or 1080, wherein after steps 1040 or 1050 (if used), decreasing levels of the total dissolved solids comprising one or more salts from the produced water having between 4,000 ppm and 260,000 ppm to 50 ppm and 1000 ppm using a treatment selected from the group consisting of: OARO, VMD, and combinations thereof, and thereby producing desalinated water.

FIGS. 2A and 2B is a schematic diagram of one embodiment of the apparatus 1000 which can be used to practice the method of FIG. 1.

FIGS. 3A, 3B, and 3C are a flow chart of one embodiment of the method and apparatus.

In step 1002, produced water 40 is obtained which can include heavy metals, oil and grease, water soluble organics, suspended solids, and total dissolved solids comprising one or more salts that will need to be treated.

Step 1010 can include the removal of heavy metals which can include the introduction of an oxidizer 200 and/or pH adjustment. Various oxidizers can be used including without limitation introduction of hydrogen peroxide, ozone, UV, chlorine, bromine, generation of hydroxyl free radicals using high pressure and temperature, and/or potassium permanganate, and/or electro-oxidation, and/or thermal oxidation. Alternatively, or additionally, magnesium oxide and/or a caustic can be added to adjust the pH. The treated fluid leaves step 1010 via line 71 for future treatment in step 1030.

Steps 1030 and 1040 schematically show decreasing the level of water-soluble organics from the produced water. These steps can be combined or optionally only one of step 1030 or 1040 can be used.

In step 1030 the levels of water-soluble organics can be decreased via at least one ultra filtration process paths and/or vessels 300 (and/or 302). Alternatively, bag filtration, multimedia filtration, cartridge filtration, screen-filters, self-cleaning filters, membrane filtration, centrifugation, hydro cyclones, and/or filtration with replaceable surface filtration media such as diatomaceous earth can be used. Preferably during this treatment step, the TDS levels are reduced by at least 5, 10, and 20 percent. In various embodiments the TDS levels can be reduced by a percentage falling within a range of between any two of the above referenced minimum percentages for TDS reduction (e.g., between 65 and 99 percent). The treated fluid leaves step 1030 via line 75 and enters step 1040.

In step 1040 the levels of water-soluble organics in the produced water can be reduced to below 100 ppm using a treatment selected from the group consisting of: absorbents, and adsorbents, and combinations thereof. In FIG. 2A step 1040 schematically shows the removal of fine particles from the fluid including microorganisms via at least one granulated activated carbon filter 320 (and/or 322). Furthermore, removal of organics can be obtained using fine aluminum oxide and/or boehmite as an absorbent and/or polymeric adsorbents. Removal of water-soluble organics may be achieved by adsorbents such as granular activated carbon (GAC), clays, metal organic framework compounds (MOFs), Covalent Organic Framework compounds (COFs), and/or polymeric sorbents, after pH is optionally adjusted to maximize the adsorption. The treated fluid leaves step 1040 via line 76 and enters step 1050.

Step 1050 schematically shows the removal of residual suspended and/or colloidal solids from the fluid via at least one ultrafiltration process paths and/or vessels 330 (and/or 332). This step may be avoided depending on the condition of the produced fluid leaving step 1030 and/or 1040, particularly when turbidity values are less than 1 NTU. Removal of residual fine particles including microorganisms from effluent may be achieved by ultrafiltration, microfiltration, fine sand filtration, and/or filtration with replaceable surface filtration media such as diatomaceous earth, inorganic media or combination. The treated fluid leaves step 1050 via line 77 and can be stored temporarily in a pretreated storage tank 42. Step 1050 can be bypassed by the method and apparatus by opening bypass valves 342 and 344 to cause the fluid in line 76 to move through bypass line 340 to line 77 bypassing filtration units 330 and 332.

Step 1062 schematically shows an optional disinfection step which can be used as further preparation before a desalination step 1070. Optional disinfection step 1060 can use ultraviolet treatment of the pre-treated fluid for controlling bacteria and becomes of relevance under said embodiment when the bacteria levels in the obtained produced water are greater than 10,000 Colony Forming units per milliliters (CFU/ml). Alternatively, an ozonation and/or non-oxidizing biocide can be added to the fluid.

Steps 1070 and/or 1080 schematically shows treating the total dissolved solids comprising one or more salts from produced water to a final concentration of 26 percent or more using a treatment selected from the group consisting of: OARO, VMD, and combinations thereof, and thereby producing desalinated water having less than 2 ppm of heavy metals, less than 1 ppm of oil and grease, less than 10 ppm of water-soluble organics, less than 1 ppm of total suspended solids, and less than 1000 ppm of TDS.

Depending on the amount of total dissolved solids in the produced water entering step 1070, an ultimate desalination step can be either OARO and/or VMD. Preferably, OARO will be used first for desalination, however, for extremely high levels of total dissolved solids, as well as the economics of a particular project, OARO is not practical and VMD can be used instead. OARO is not practical for extremely high levels of TDS as such high levels can increase the required osmotic pressures to be above the acceptable pressures for the membranes in the OARO step. Although VMD can handle much higher levels of TDS in the fluid compared to OARO, OARO is preferred because VMD has increased capital and operating costs compared to OARO.

For produced water with starting TDS levels less than 15%, OARO in step 1070 may be used first to maximize desalinated water recovery, salt rejection, and energy efficiency of the overall process. Project-specific requirements such as capital expenditure and the availability of thermal energy sources (VMD requires the use of thermal energy sources) will also determine the use of OARO first, or as a standalone for treating produced water with TDS levels less than 15%.

Steps 1070 (OARO) and 1080 (VMD) Treatment in Series

The pre-treated fluid enters step 1070 via line 80, entering RO unit 450. Pump 66 can control the flow rate and pressure against the membrane in RO unit 450. Part of the fluid in line 80 passes through the membrane in RO unit 450 thereby becoming permeate and entering line 85, while the remainder of the fluid exits RO unit 450 via line 81 as concentrate. The concentrated fluid enters RO unit 400. Pump 66 can also control the flow rate and pressure against the membrane in RO unit 400. Part of the fluid in line 81 passes through the membrane in RO unit 400 thereby becoming permeate and entering line 84, while the remainder of the fluid exits RO unit 400 via line 82 as concentrate. To lower the amount of osmotic pressure differential needed to push fluid through the membrane in RO unit 400, part of the concentrate fluid leaving line 82 is directed through line 83 to the permeate side of the membrane in RO unit 400. Now the combination of permeate through the membrane in RO Unit 400 and the concentrate fluid directed to line 83 are both directed through valve 100 again entering line 80 (in combination with additional fluid from pre-treated water storage tank 42) to the inlet of RO unit 450 for treatment a second time. Such redirection of permeate from RO unit 400 along with new water from pre-treated storage tank 42 into both RO units 450 and 400 can be performed multiple times with the relative amounts of water from tank 42 and permeate from line 84 controlled by the method and apparatus controlling one or more of the pump 64, valve 100, and/or pump 66. The multiple runs of the combination of permeate/redirected concentrate fluid passing through the membrane in RO unit 400 becoming permeate and entering line 85 is directed to first desalination tank 44 as a first desalination stream. The remainder of the multiple runs of this combination permeate/redirected concentrate fluid enters line 82 to concentrated storage tank 50. As schematically shown in FIG. 2B, any solids formed and/or precipitated in line 82 can be continuously removed using filter, centrifuge, hydrocyclone, or combination and sent to the precipitated solids storage tank 490.

Concentrated brine 50 from the desalination step 1070 may be disposed of or used for recovery of additional resources including minerals and rare earth elements. Optionally, step 1080 using VMD can be used to further concentrate fluid from tank 50 and then sent to concentrate storage tank 52.

For TDS levels above between 15% to 18% of concentrated brine in the produced water, VMD can be used as standalone or in combination with OARO. Pump 67 moves concentrate from concentrate 50 to step 1080 via line 611 and into VMD reservoir 620. Pump 68 pulls fluid from VMD reservoir 620 and into inlet 602 of VMD unit 600. Permeate vapor passes through the VMD membrane and can be condensed into permeate fluid via a heat exchanger optionally simultaneously recovering heat for increased efficiencies (not shown). The permeate fluid then exits line 91 which is directed by the method and apparatus via valve 106 and line 86 to second desalinated tank 45 as second desalinated fluid stream. The remainder of the fluid exits VMD unit 600 via line 92 and enters concentrated storage tank 52 or based on the fluid exiting VMD unit 600 meeting certain predetermined conditions, the method and apparatus can control valve 114 to route back part or all of this exiting fluid to via line 610 to reservoir 620 for re-treatment by VMD unit 600. Method and apparatus can cause multiple loops of re-treatment of the fluid exiting VMD unit 600 via line 92 until such fluid meets certain predefined treatment levels for such fluid. As schematically shown in FIG. 2B, any solids formed and/or precipitated in line 92 can be continuously removed using filter, centrifuge, hydrocyclone, or combination and sent to the precipitated solids storage tank 630. Embodiments of the present disclosure allow for 1080 to be performed in a batch architecture (not shown) thereby providing more flexibility when pumping from a reservoir tank that is isolated from a continuously incoming VMD reservoir tank like 620. This isolated tank or tanks (not shown) would be connected in parallel with VMD reservoir tank 620 through a series of pipelines connected to 602, 610, and 611, each containing isolating valves to allow for bypassing the isolated tank or tanks as needed. While not the main reason to perform batch processing of the VMD unit 1080, the frequent problems associated with these systems is membrane ‘pore wetting’ and fouling. During feed a bleed architecture, the membrane surface is possibly susceptible to interaction with increased concentrations of reactive components in the feed solution, thus making the membrane hydrophilic with its pores wetted by feed solution. This will greatly affect the separation efficiency as the feed water could enter the membrane. In addition, there is a greater possibility for fouling due to the accumulation of unwanted species such as salt, particulates, or biofilms on the membrane surface and pores. This could result in vapor transfer or in pore wetting. In most situations, the selection between either using 1080 in a feed and bleed or batch architecture would depend on to an integrated treatment process, which considers the unique characteristics of the produced waters and treatment technologies to optimize cost and energy consumption.

Concentrated brine 52 from the desalination step 1080 may be disposed of or used for recovery of additional resources including minerals and rare earth elements.

Step 1070 (OARO) by Itself

Here, based on levels of the concentrate fluid in tank 50, the method and apparatus determine that it does not need to use the VMD step 1080 to treat the concentrate fluid in tank 50. The pre-treated fluid enters step 1070 via line 80, entering RO unit 450. Pump 66 can control the flow rate and pressure against the membrane in RO unit 450. Part of the fluid in line 80 passes through the membrane in RO unit 450 thereby becoming permeate and entering line 85, while the remainder of the fluid exits RO unit 450 via line 81 as concentrate. The concentrated fluid enters RO unit 400. Pump 66 can also control the flow rate and pressure against the membrane in RO unit 400. Part of the fluid in line 81 passes through the membrane in RO unit 400 thereby becoming permeate and entering line 84, while the remainder of the fluid exits RO unit 400 via line 82 as concentrate. To lower the amount of reverse osmotic pressure needed to push fluid through the membrane in RO unit 400 part of the concentrate fluid leaving line 82 is directed through line 83 to the permeate side of the membrane in RO unit 400. Now the combination of permeate through the membrane in RO Unit 400 and the concentrate fluid directed to line 83 are both directed through valve 100 again entering line 80 (in combination with additional fluid from pre-treated water storage tank 42) to the inlet of RO unit 450 for treatment a second time. Such redirection of permeate from RO unit 400 along with new water from pre-treated storage tank 42 into both RO units 450 and 400 can be performed multiple times with the relative amounts of water from tank 42 and permeate from line 84 controlled by the method and apparatus controlling one or more of the pump 64, valve 100, and/or pump 66. The multiple runs of the combination of permeate/redirected concentrate fluid passing through the membrane in RO unit 400 becoming permeate and entering line 85 is directed to first desalination tank 45 as a first desalination stream. The remainder of the multiple runs of this combination permeate/redirected concentrate fluid enters line 82 to concentrated storage tank 50. As schematically shown in FIG. 2B, any solids formed and/or precipitated in line 82 can be continuously removed using filter, centrifuge, hydrocyclone, or combination and sent to the precipitated solids storage tank 490.

Concentrated brine 50 from the desalination step 1070 may be disposed of or used for recovery of additional resources including minerals and rare earth elements.

Bypassing Step 1070 (OARO) and Using Step 1080 (VMD) by Itself

Here, based on levels of the pretreated fluid in tank 42, the method and apparatus determine that it does not need to use the OARO step 1070 to treat the fluid in tank 42. Valve 102 is set so that pump 64 causing fluid to enter line 90 (and not line 80) to enter line 611 and VMD reservoir 620 for treatment by step 1080. Pump 68 pulls fluid from VMD reservoir 620 and into inlet 602 of VMD unit 600. Permeate passes through the VMD membrane exiting line 91 which is directed by the method and apparatus via valve 106 and line 86 to second desalinated tank 45 as second desalinated fluid stream. The remainder of the fluid exits VMD unit 600 via line 92 and enters concentrated storage tank 52, or based on the fluid exiting VMD unit 600 meeting certain predetermined conditions, the method and apparatus can control valve 114 to route back part or all of this exiting fluid via line 610 to reservoir 620 for re-treatment by VMD unit 600. Method and apparatus can cause one or more multiple loops of re-treatment of the fluid exiting VMD unit 600 via line 92 until such fluid meets certain predefined treatment levels for such fluid. As schematically shown in FIG. 2B, any solids formed and/or precipitated in line 92 can be continuously removed using filter, centrifuge, hydro-cyclone, or combinations thereof, and sent to the precipitated solids storage tank 630. Concentrated brine 52 from the VMD desalination step 1080 may be disposed of or used for recovery of additional resources including minerals and rare earth elements.

Combining First and Second Desalination Streams to Create a Third Desalination Stream In various embodiments the method and apparatus can combine fluid from first desalination tank 44 with fluid from second desalination tank 45 into third desalination tank 46 making a third desalination stream. Such decisions can be based on the quality of fluid in first desalination tank 44, second desalination tank 45 (or line 91 exiting VMD unit 600), and/or third desalination tank 46. Here, the method and apparatus can open valve 114 and cause pump 151 to pump fluid from first desalination tank 44 into third desalination tank 46, along with opening valve 106 and causing pump 150 to pump fluid from second desalination tank 45 into third desalination tank 46. Alternatively, the method and apparatus can open valve 114 and cause pump 151 to pump fluid from first desalination tank 44 into third desalination tank 46, along with opening valve 106 and causing pump 150 to pump fluid from line 91 exiting VMD unit 600 into third desalination tank 46.

Further Post-Treating Water in First Stream of Desalinated Water Storage Tank 44

In various embodiments, the method and apparatus can further treat the first stream of desalinated water, stored in tank 44 based on the quality of desalinated water, particularly for further treating of ammonia, organics, boron, and heavy metals. One example of such further treatment of the first stream of desalinated water can follow the types of further treatment specified below for second stream of desalinated water storage tank 45.

Further Treating Water in Second Stream of Desalinated Water Storage Tank 45

In various embodiments, the method and apparatus can further treat the water in second desalination tank based on the quality of fluid in second desalination tank 45. For example, the method and apparatus can open valve 108 and cause pump 152 to move fluid in line 95 with its pH selectively increased or decreased by acid base injector 700 to a predetermined value, cooled by heat exchanger 710 to a predetermined value, and then sent to polishing RO unit 460 via step 2000.

Polishing of the permeates from step 1080 (VMD) can be further treated in step 2000 by polishing such as reduction/removal of ammonia, boron, heavy metals, and/or organics. This embodiment is preferred where the VMD second stream of desalinated water (line 91 sent to second desalination tank 45) contains ammonia and is therefore used to remove ammonia, solely after pH is reduced or increased to between 6 and 8 using either an acid or base solution, respectively. The acid or base are introduced into the system of pipelines via acid/base injector 700 connecting the VMD second stream of desalinated water to the RO unit 460. However, before the final RO polishing step takes place, but after the acid/base injection was added, the second stream of desalinated water gets cooled down to 40C via heat exchanger 710 due to temperature limits of membranes used within the RO step 2000. Further polishing with RO unit 460 to generate a fourth stream of desalinated water is performed to remove any ammonia and volatile molecules that may have not been filtered out by VMD in the first place. Said ammonia and volatile molecules pass through the VMD because they are volatile at the VMD operating conditions and pass into distillate similar to water vapor.

Step 2000 schematically showing the optional removal of residual organics, ammonia, boron, heavy metals, and/or other components from the desalinated water stream in second desalination tank 45. While in line 95 residual organics and/or ammonia can be removed from the desalinated water stream in line 95 before entering fourth desalinated storage tank 47. Such optional removal of ammonia from the second desalinated water stream in second desalinated storage tank 45 may be achieved by air stripping, ion-exchange, membrane contactor, electrodialysis, or combination thereof. Additionally, removal of organics from the second desalinated water stream in second desalinated storage tank 45 may be accomplished by adsorption on GAC, clays, MOFs, COFs, or polymeric sorbents; or by advanced oxidation processes (AOPs), depending on the nature of beneficial reuse of the second desalinated water stream in second desalinated storage tank 45. Selection of AOP may be determined from the characteristics of residual organics. AOPs include UV/$H_2O_2$, Ozone/$H_2O_2$, Fe/$H_2O_2$, thermal oxidation, or their combination. Additionally, removal of boron can be accomplished by boron selective ion exchange or chelating resin, or further treatment by RO. Step 2000 creates a fourth desalinated water stream which is in fourth desalinated water storage tank 47.

Retreating Second Desalination Stream Using Step 1070 OARO and/or Step 1080 VMD Further embodiments of the disclosure also provide for having the second stream of desalinated water from tank 45 treated with the acid/base injection via injector 700 as well as cooled down via heat exchanger 710, to be transmitted via system of pipelines (valve 112 to line 96 to inlet line 80) back to the OARO step 1070 for acting as a polisher instead of using RO unit 460 in treatment step 2000.

Desalinated water from first, second, third, and/or fourth desalinated streams may be used for irrigation of crops, trees, and/or land grass, dust suppression, power generation, process water for cooling and heating systems, and/or in industrial manufacturing processes. Future regulations may provide for the desalinated water to be used for livestock and/or human consumption.

EXAMPLES

Example 1

Oil and Gas industry produced water was obtained from the Permian Basin in the US, pretreated by dissolved air flotation, and then 8 L volume was filtered through microfiltration membrane that was coated with aluminum oxide layer, at a flow rate of 2 gallons per hour (7.57 liters per hour). The turbidity decreased from 1.7 NTU to 0.2 NTU. Such turbidity is desired for subsequent OARO and/or VMD operation. Also, conductivity decreased by over 15% from 141.7 mS/cm to 119.6 mS/cm (1 mS is 1 milliSiemens). Such a reduction in conductivity can lower the energy for desalination and therefore the cost, since desalination energy consumption is dependent on feed salinity, especially in OARO.

Example 2

Produced water from Unconventional Oil and Gas production in the United States was (a) filtered sequentially through (a.1) 5-µm green sand, (a.2) 1-µm carbon, and (a.3) again 1-µm filters, followed by (b) UV disinfection and ultrafiltration before (c) desalination by OARO-RO process. Overall water recovery from OARO-RO process was 81.9%. The water quality changes after these treatments are summarized in Table 1.

TABLE 1

Produced Water quality changes after pretreatment and OARO-RO desalination.

| Parameter (mg/L) | Raw PW | OARO-RO Feed(after Pretreatment) | OARO-RO Permeate (Desalinated water) |
|---|---|---|---|
| pH (pH Units) | 7.59 | 8.24 | 7.79 |
| TOC | 55 | 17 | 11 |
| TDS | 4,474 | 4,086 | 88 |
| Boron | 16 | 8 | 6 |
| Barium | 2 | <1 | <1 |
| Calcium | 62 | 27 | <1 |
| Iron | 5 | <1 | <1 |
| Potassium | 21 | | <1 |
| Lithium | 3 | 2 | <1 |
| Magnesium | 8 | 8 | <1 |
| Sodium | 1,649 | 1,439 | 4 |
| Silicon | 36 | 26 | <1 |
| Strontium | 13 | 5 | <1 |
| Chloride | 2,645 | 2,248 | <20 |
| Iodide | 30 | 27 | 17 |
| Sulfate | <39 | <39 | <39 |

Example 3

Example 2 involved produced water with higher TDS than in Example 1 (7,427 mg/L compared to 4,474 mg/L) and was treated with the same process as in Example 1. The water quality changes after treatment of this water are summarized in Table 2.

TABLE 2

Produced Water quality changes after pretreatment and OARO-RO desalination of higher TDS water than in Example 1.

| Parameter (mg/L) | Raw PW | OARO-RO Feed(after Pretreatment) | OARO-RO Permeate (Desalinated water) |
|---|---|---|---|
| pH (pH Units) | 7.83 | 7.93 | 7.28 |
| TOC | 49.7 | 11.6 | 7.43 |
| TDS | 7,427 | 5,534 | 204 |
| Boron | 38 | 17 | 24 |
| Barium | 3 | <1 | <1 |
| Calcium | 92 | 84 | <1 |
| Iron | 2 | <1 | <1 |
| Potassium | 34 | 29 | <1 |
| Lithium | 6 | 4 | <1 |
| Magnesium | 9 | 12 | <1 |
| Sodium | 2,949 | 2,022 | 7 |
| Silicon | 57 | 43 | <1 |
| Strontium | 19 | 14 | <1 |
| Chloride | 4,717 | 3,526 | 11 |

TABLE 2-continued

Produced Water quality changes after pretreatment and OARO-RO desalination of higher TDS water than in Example 1.

| Parameter (mg/L) | Raw PW | OARO-RO Feed(after Pretreatment) | OARO-RO Permeate (Desalinated water) |
|---|---|---|---|
| Iodide | 30 | 19 | 11 |
| Sulfate | <41 | 55 | <18 |

Example 4

Produced water from Unconventional Oil and Gas production in the United States was: (a) filtered through 2.7 μm filter and (b) processed through a column packed with resin Resin A or Resin B for 10-12 bed volumes. Raw produced water samples were also treated by alumina and coagulant+flocculant, separately. Produced water was mixed with 1000 ppm of alumina or 250 ppm coagulant+250 ppm flocculant for 15-30 min at room temperature and then filtered through 0.45 μm filter. The TOC values before and after these treatments are shown in Table 3. The significant reduction in TOC is an indication of lower potential for organic and biofouling of desalination membranes.

TABLE 3

TOC (ppm) in produced water before and after treatment:

| Treatment Method | Raw PW | Treated PW |
|---|---|---|
| Ion Exchange Resin-A | 60 | 2-22 |
| Alumina | 90 | 11 |
| Ion Exchange Resin-B | 90 | 10 |
| Coagulant A + Flocculant A | 90 | 12 |

Example 5

Oil and Gas industry produced water was obtained from western US, pre-treated to remove suspended solids, turbidity and organics and then desalinated by OARO at a 5 gallons per minute feed flow. The total dissolved solids in OARO feed, permeate, and concentrate were 2,140 ppm, 200 ppm, and 20,167 ppm, respectively demonstrating over 9× concentration of dissolved solids, while providing water with salinity like fresh water.

Example 6

Oil and Gas industry produced water was obtained from western US, pre-treated to remove suspended solids, turbidity and organics and then desalinated by VMD at a 5 gallons per minute feed flow. The total dissolved solids in VMD feed and distillate were 107,107 ppm and 389 ppm, respectively, demonstrating high desalination efficiency as the water produced had salinity like fresh water, in-spite of the feed being over 3× that of common seawater.

Example 7

Oil and Gas industry produced water was obtained from western US and treated using the various embodiments of the disclosed invention to show the following levels at each step for heavy metals, oil and grease, water-soluble organics, suspended solids, and total dissolved solids

TABLE 4

Parameters in desalinated water before and after each treatment:

| Parameter (ppm) | Raw PW | MF with regenerable Surface Layer | Sorbent Packed bed | OARO alone | VMD alone | OARO + VMD (OARO Conc. Treatment by VMD) |
|---|---|---|---|---|---|---|
| Heavy Metals | 1,000-3,000 | 500-2,500 | 500-2,500 | <2 | <2 | <2 |
| Oil and Grease | 2-50 | <10 | <2 | <1 | <1 | <1 |
| Water soluble organics | <100 | <100 | <30 | <10 | <10 | <10 |
| Total Dissolved Solids | 400-260,000 | 400-260,000 | 400-260,000 | <1000 | <500 | <500 |
| Turbidity (NTU) | 5-400 | 0.1-3 | 0.1-3 | <0.2 | <0.2 | <0.2 |

LIST FOR REFERENCE NUMERALS

| (Reference No.) | (Description) |
|---|---|
| 40 | raw produced water to be treated |
| 42 | pre-treated water |
| 44 | desalinated water |
| 45 | desalinated water |
| 46 | desalinated water |
| 47 | desalinated water |
| 50 | concentrate |
| 52 | concentrate |
| 60 | pump |
| 61 | pump |
| 62 | pump |
| 63 | pump |
| 64 | pump |
| 65 | pump |
| 66 | pump |
| 67 | pump |
| 68 | pump |
| 69 | pump |
| 70 | line |
| 71 | line |
| 72 | line |
| 73 | line |
| 74 | line |
| 75 | line |
| 76 | line |
| 78 | line |
| 80 | line |
| 81 | line |
| 82 | line |
| 83 | line |
| 84 | line |
| 85 | line |
| 86 | line |
| 90 | line |
| 91 | line |
| 92 | line |
| 93 | line |
| 94 | line |
| 95 | line |
| 96 | line |
| 100 | valve |
| 102 | valve |
| 104 | valve |
| 106 | valve |
| 108 | valve |
| 110 | valve |
| 112 | valve |
| 114 | valve |
| 150 | pump |

-continued

LIST FOR REFERENCE NUMERALS

| (Reference No.) | (Description) |
|---|---|
| 151 | pump |
| 152 | pump |
| 200 | oxidizer treatment |
| 220 | sludge storage tank |
| 300 | ultra-filtration unit |
| 302 | ultra-filtration unit |
| 320 | GAC unit |
| 322 | GAC unit |
| 330 | ultra-filtration unit |
| 332 | ultra-filtration unit |
| 340 | bypass line |
| 342 | bypass valve |
| 344 | bypass valve |
| 400 | first RO unit |
| 450 | second RO unit |
| 460 | third RO unit |
| 490 | precipitated solids storage |
| 492 | separating apparatus for liquid/solids |
| 600 | VMD Unit |
| 602 | inlet |
| 604 | outlet |
| 610 | line |
| 620 | reservoir |
| 630 | precipitated solids storage |
| 632 | separating apparatus for liquid/solids |
| 700 | pH adjustment |
| 710 | heat exchanger |
| 1000 | method and apparatus |
| 1002 | step of obtaining produced water |
| 1010 | step schematically showing the removal of heavy metals such as by oxidation (if needed |
| 1012 | step schematically showing different treatment based on bacteria levels in the water being greater than or less than 10,000 |
| 1014 | step schematically showing use of ozone, UV, and/or hydroxyl feel radicals if bacterial levels are greater than 10,000 |
| 1016 | step schematically showing use of oxygen, hydrogen peroxide, chlorine, bromine, bleach, $ClO_2$, and/or peracetic acid if bacterial levels are less than 10,000 |
| 1030 | step schematically showing the removal of particles from the treated produced water including water-soluble organics (if needed). This step can use microfiltration to decrease levels of heavy metals, oil and grease, water-soluble organics, suspended solids, and/or total dissolved solids (if needed). |
| 1040 | step schematically showing the removal of particles from the treated produced water including water-soluble organics (if needed). This step can use a packed bed or fluidized bed vessels to decrease levels of heavy metals, oil and grease, water-soluble organics, suspended solids, and/or total dissolved solids (if needed). |
| 1050 | step schematically shows the removal/neutralization of residual oxidants from the fluid. This step may be skipped depending on the condition of the produced fluid leaving step 1030 and/or 1040, particularly when turbidity values are greater than 1 NTU. |
| 1060 | step schematically showing the production of a volume of pre-treated fluid ready for further treatment. |
| 1062 | step schematically shows an optional disinfection step which can be used as further preparation before a desalination step 1070. |
| 1070 | step schematically showing the low salinity fluids to be treated such as by OARO |

-continued

LIST FOR REFERENCE NUMERALS

| (Reference No.) | (Description) |
|---|---|
| 1080 | step schematically showing optional VMD for high salinity fluids to be treated |
| 1100 | step of combining first desalinated water stream with second desalinated water stream. |
| 1150 | step of adjusting the pH of desalinated fluid by either injecting acid (to lower pH) or base (in increase pH). |
| 1152 | step of injecting acid to decrease pH to a predetermined target value. |
| 1154 | step of injecting base to increase pH to a predetermined target value. |
| 1180 | step of causing desalinated water stream to meet a predetermined target value. |
| 1200 | step of determining whether desalinated water stream(s) meet a predetermined target value regarding pass through volatile molecules and if not performing further treatment to generate a fourth desalinated water stream. |
| 1300 | step of determining whether desalinated water stream(s) meet a predetermined target values regarding TDS and Recovery Levels, and if not performing further treatment to generate a fourth desalinated water stream. |
| 2000 | step schematically showing a polishing step removing of residual organics, boron, heavy metals, and/or ammonia from desalinated water stream (if needed) |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. An integrated process to treat produced water generated during oil and gas production, comprising the steps of:

(a) obtaining produced water from an oil and/or gas producing well, water transfer pipeline or salt-water disposal well, wherein the produced water includes: heavy metals, oil and grease, water soluble organics, colloidal and suspended solids, and 5,000 to 300,000 ppm of total dissolved solids;

(b) treating the produced water of step “a” by (i) adding an oxidizer selected from the group consisting of: oxygen, hydrogen peroxide, chlorine, bromine, bleach, $ClO_2$, peracetic acid, and combinations thereof; and/or (ii) treating the produced water of step “a” using at least one of the following: ozone, UV, hydroxyl free radicals, and combinations thereof;

(c) using a filtration system to treat the produced water of step “b” until the produced water satisfies each of the following plurality of specified treatment levels:

| | |
|---|---|
| heavy metals | less than 10 ppm, |
| oil and grease | less than 100 ppm, |
| water-soluble organics | less than 100 ppm, and |
| suspended solids | less than 50 ppm; |

(d) creating a pretreated water stream from the produced water of step "c" by passing it through a packed bed or fluidized bed vessel containing media selected from the group consisting of: granulated activated carbon, metal-organic frameworks, covalent organic frameworks, clays, polymeric sorbents, and combinations thereof thereby decreasing water-soluble organics;

(e) creating a first volume of pretreated water by sending the pre-treated water stream of step "d" to a pre-treatment water storage tank wherein the storage tank is fluidly connected to the packed bed or fluidized bed vessel; and (f) using osmotically assisted reverse osmosis ("OARO") and/or vacuum membrane distillation ("VMD") to treat a second volume of water from the pre-treatment water storage tank thereby further decreasing levels of total dissolved solids to less than 1000 ppm, and creating at least two output streams selected from the group consisting of:

a first concentrated water stream, a second concentrated water stream, a first desalinated water stream, a second desalinated water stream, a first precipitated solids stream, a second precipitated solids stream, and combinations thereof, with the proviso that at least OARO is used in the step "f", the OARO further comprises an osmotically assisted cascade concentrator and a water desalination system that creates at least a first dilute draw stream using a first OARO stage, at least a second dilute draw stream using a second OARO stage, a desalinated stream using reverse osmosis from the first dilute draw stream and the second dilute draw stream, and a reject stream from the second OARO stage.

2. The process of claim 1, wherein in step (c) the filtration system includes a system having a structural filtration component configured for performing filtration selected from the group consisting of:

(i) microfiltration, (ii) ultrafiltration, (iii) fine sand filtration, and (iv) filtration with a replaceable filtration media selected from the group consisting of diatomaceous earth, inorganic media, and combinations thereof; and (v) combinations of the one or more of the above.

3. The process of claim 1, wherein in step (c), the filtration system includes a microfiltration component that includes a membrane coating having a regenerable surface layer selected from the group consisting of: metal oxide powder, aluminosilicate, aluminum oxide, iron oxide, powdered activated carbon, clay, polymeric sorbent, catalyst, and combinations thereof.

4. An integrated process to treat produced water generated during oil and gas production, comprising the steps of:

(a) obtaining produced water from an oil and/or gas producing well, water transfer pipeline or salt-water disposal well, wherein the produced water includes: heavy metals, oil and grease, water soluble organics, colloidal and suspended solids, and 5,000 to 300,000 ppm of total dissolved solids;

(b) treating the produced water of step "a" by (i) adding an oxidizer selected from the group consisting of: oxygen, hydrogen peroxide, chlorine, bromine, bleach, $ClO_2$, peracetic acid, and combinations thereof; and/or (ii) treating the produced water of step "a" using at least one of the following: ozone, UV, hydroxyl free radicals, and combinations thereof;

(c) using a filtration system to treat the produced water of step "b" until the produced water satisfies each of the following plurality of specified treatment levels:

| | |
|---|---|
| heavy metals | less than 10 ppm, |
| oil and grease | less than 100 ppm, |
| water-soluble organics | less than 100 ppm, and |
| suspended solids | less than 50 ppm; |

(d) creating a pretreated water stream from the produced water of step "c" by passing it through a packed bed or fluidized bed vessel containing media selected from the group consisting of: granulated activated carbon, metal-organic frameworks, covalent organic frameworks, clays, polymeric sorbents, and combinations thereof thereby decreasing water-soluble organics;

(e) creating a first volume of pretreated water by sending the pre-treated water stream of step "d" to a pre-treatment water storage tank wherein the storage tank is fluidly connected to the packed bed or fluidized bed vessel; and (f) using osmotically assisted reverse osmosis ("OARO") and/or vacuum membrane distillation ("VMD") to treat a second volume of water from the pre-treatment water storage tank thereby further decreasing levels of total dissolved solids to less than 1000 ppm, and creating at least two output streams selected from the group consisting of:

a first concentrated water stream, a second concentrated water stream, a first desalinated water stream, a second desalinated water stream, a first precipitated solids stream, a second precipitated solids stream, and combinations thereof, with the proviso that both OARO and VMD are used in the step "f", and the OARO and VMD further comprises:

(i) treating the second volume of water in first and second RO units, wherein the first RO unit has a first RO input, and creates a first RO concentrate stream and a first RO permeate stream, and the second RO unit has a second RO input and creates a second RO concentrate stream and a second RO permeate stream, (ii) wherein the second RO permeate stream is selectively fluidly connected to the first RO input and wherein the second RO concentrate stream is selectively fluidly connected to the second RO permeate stream, (iii) a VMD unit having a VMD input and creating
a VMD concentrate stream and
a VMD permeate stream, wherein
(iv) the VMD permeate stream
is selectively fluidly connected to both
the VMD input and
the first RO input.

5. The process of claim 4, wherein, when both OARO and VMD are used in step "f", the first RO permeate stream is combined with the VMD permeate stream.

6. The process of claim 4, wherein, when both OARO and VMD are used in step "f", the second RO concentrate stream has solids and these solids are treated with a treatment unit selected from the group consisting of: filter, centrifuge, hydrocyclone, and combinations thereof.

7. An integrated process to treat produced water generated during oil and gas production, comprising the steps of:

(a) obtaining produced water from an oil and/or gas producing well, water transfer pipeline or salt-water disposal well, wherein the produced water includes: heavy metals, oil and grease, water soluble organics, colloidal and suspended solids, and 5,000 to 300,000 ppm of total dissolved solids;

(b) treating the produced water of step "a" by (i) adding an oxidizer selected from the group consisting of: oxygen, hydrogen peroxide, chlorine, bromine, bleach, $ClO_2$, peracetic acid, and combinations thereof; and/or (ii) treating the produced water of step "a" using at least one of the following: ozone, UV, hydroxyl free radicals, and combinations thereof;

(c) using a filtration system to treat the produced water of step "b" until the produced water satisfies each of the following plurality of specified treatment levels:

| | |
|---|---|
| heavy metals | less than 10 ppm, |
| oil and grease | less than 10 ppm, |
| water-soluble organics | less than 100 ppm, and |
| suspended solids | less than 50 ppm; |

(d) creating a pretreated water stream from the produced water of step "c" by passing it through a packed bed or fluidized bed vessel containing media selected from the group consisting of: granulated activated carbon, metal-organic frameworks, covalent organic frameworks, clays, polymeric sorbents, and combinations thereof thereby decreasing water-soluble organics;

(e) creating a first volume of pretreated water by sending the pre-treated water stream of step "d" to a pre-treatment water storage tank wherein the storage tank is fluidly connected to the packed bed or fluidized bed vessel;

(f) using OARO and/or VMD to treat a second volume of water from the pre-treatment water storage tank thereby further decreasing levels of total dissolved solids to less than 1000 ppm, and creating at least two output streams selected from the group consisting of: a first concentrated water stream, a second concentrated water stream, a first desalinated water stream, a second desalinated water stream, a first precipitated solids stream, a second precipitated solids stream, and combinations thereof, with the proviso that at least OARO is used in the step "f", and the OARO further comprises an osmotically assisted cascade concentrator and water desalination system that creates at least a first dilute draw stream using a first OARO stage, at least a second dilute draw stream using a second OARO stage, a desalinated stream using reverse osmosis from the first and second dilute draw solution, and a reject stream from the second OARO stage.

8. The process of claim 7, wherein the packed bed or fluidized bed vessel of step "d" further comprises using an ultra-filtration system for further decreasing the levels of the colloidal and suspended solids in the obtained produced water and generating a pre-treated water stream with decreased soluble organics and colloidal and suspended solids.

9. The process of claim 7, wherein in step "f" the first desalinated water stream from the treatment is selected from the group consisting of OARO, or the second desalinated water stream from the treatment is selected from the group consisting of VMD, further having a density of 8.35 ppg, a pH of 6-10, total organic carbon of 1-5 ppm, total dissolved solids of 20-1000 ppm, specific conductivity of 20-3000 µS/cm, a hardness as $CaCO_3$ of 1-1000 ppm, Fluoride of 0-2 ppm, Chloride of 1-2000 ppm, Bromide of 1-1000 ppm, Iodide of 0-20 ppm, $NO_3$ of 0-10 ppm, $PO_4$ of less than 2, SO4 of 0-100, Ammonia Nitrogen of 0-200 ppm, Silver of less than 1 ppm, Aluminum of less than 1 ppm, Arsenic of less than 1 ppm, Boron of less than 3 ppm, Barium of less than 1 ppm, Beryllium of less than 1 ppm, Calcium of 10-300 ppm, Cadmium of less than 1 ppm, Copper of less than 1 ppm, Chromium of less than 1 ppm, Iron of less than 1 ppm, Potassium of 0-100 ppm, Lithium of less than 10 ppm, Magnesium of 10-100 ppm, Manganese of less than 1 ppm, Molybdenum of less than 1 ppm, Sodium of 10-500 ppm, Nickel of less than 1 ppm, Phosphorous of less than 1 ppm, Lead of less than 1 ppm, Antimony of less than 1 ppm, Selenium of less than 1 ppm, Silicon of 0-2 ppm, Tin of less than 1 ppm, Strontium of 0-200 ppm, Vanadium of less than 1 ppm, Zinc of less than 1 ppm.

10. The process of claim 7, wherein, when at least VMD is used, the VMD treatment of step "f" further comprising membranes selected from the group consisting of hollow-fiber membranes, capillary membranes, spiral wound membranes, plate frame membranes, and combinations thereof.

11. The process of claim 10, wherein, when at least hollow-fiber membranes or capillary membranes are used, the hollow-fiber membranes or capillary membranes are bundled inside a housing having a fiber packing density of less than 60% to operate a vapor velocity between 15.24 meters/second to 45.72 meters/second (50 feet/second to 150 feet/second).

12. The process of claim 11, wherein in step (c) TDS is reduced by at least 5 percent or at least 20 percent.

13. The process of claim 11, wherein in step (c) the filtration system includes a system having a structural filtration component configured for performing filtration selected from the group consisting of:

(i) microfiltration,
(ii) ultrafiltration,
(iii) fine sand filtration, and
(iv) filtration with a replaceable filtration media selected from the group consisting of diatomaceous earth, inorganic media, and combinations thereof; and
(v) combinations of the one or more of the above.

14. The process of claim 11, wherein in step (c), the filtration system includes a microfiltration component that includes a membrane coating having a regenerable surface layer selected from the group consisting of: metal oxide powder, aluminosilicate, aluminum oxide, iron oxide, powdered activated carbon, clay, polymeric sorbent, catalyst, and combinations thereof.

15. The process of claim 7, wherein, when at least OARO is used, the OARO of step "f" further comprising membranes selected from the group consisting of hollow-fiber membranes, capillary membranes, spiral wound membranes, plate frame membranes, and combinations thereof.

16. The process of claim 7, wherein, when at least OARO is used, the OARO treatment of step "f" further includes both a pre-concentration stage and a final desalination stage, wherein the pre-concentration stage is RO.

17. The process of claim 7, wherein, when at least OARO is used, the generated first stream of desalinated water from the treatment selected from the OARO in step "f" is treated for residual organics, ammonia, heavy metals, and boron.

18. The process of claim 17, wherein in step (c) TDS is reduced by at least 5 percent or at least 20 percent.

19. The process of claim 17, wherein in step (c) the filtration system includes a system having a structural filtration component configured for performing filtration selected from the group consisting of:

(i) microfiltration, (ii) ultrafiltration, (iii) fine sand filtration, and (iv) filtration with a replaceable filtration media selected from the group consisting of diatomaceous earth, inorganic media, and combinations thereof; and (v) combinations of the one or more of the above.

20. The process of claim 17, wherein in step (c), the filtration system includes a microfiltration component that includes a membrane coating having a regenerable surface layer selected from the group consisting of: metal oxide powder, aluminosilicate, aluminum oxide, iron oxide, powdered activated carbon, clay, polymeric sorbent, catalyst, and combinations thereof.

21. The process of claim 7, wherein, when at least OARO is used in step "f", the OARO further comprises:

(a) first and second RO units, wherein the first RO unit has a first RO input and creates a first RO concentrate stream and a first RO permeate stream, and the second RO unit has a second RO input and creates a second RO concentrate stream and second RO permeate stream, (b) wherein the second RO permeate stream is selectively fluidly connected to the first RO input and wherein the second RO concentrate stream is selectively fluidly connected to the second RO permeate stream.

22. The process of claim 7, wherein, when both OARO and VMD are used in step "f", the OARO and VMD units are selectively configurable in series or parallel treatment.

23. The process of claim 7, wherein, when at least VMD is used, the VMD treatment of step "f" further comprises a VMD unit having a VMD input and creating a VMD concentrate stream and a VMD permeate stream, wherein the VMD concentrate stream is fluidly connected to the VMD input.

24. An integrated process to treat produced water generated during oil and gas production, comprising the steps of:

(a) obtaining produced water from an oil and/or gas producing well, water transfer pipeline or salt-water disposal well, wherein the produced water includes: heavy metals, oil and grease, water soluble organics, colloidal and suspended solids, and 5,000 to 300,000 ppm of total dissolved solids;

(b) treating the produced water of step "a" by (i) adding an oxidizer selected from the group consisting of: oxygen, hydrogen peroxide, chlorine, bromine, bleach, ClO, peracetic acid, and combinations thereof; and/or (ii) treating the produced water of step "a" using at least one of the following: ozone, UV, hydroxyl free radicals, and combinations thereof;

(c) using a filtration system to treat the produced water of step "b" until the produced water satisfies each of the following plurality of specified treatment levels:

| | |
|---|---|
| heavy metals | less than 10 ppm, |
| oil and grease | less than 10 ppm, |
| water-soluble organics | less than 100 ppm, and |
| suspended solids | less than 50 ppm; |

(d) creating a pretreated water stream from the produced water of step "c" by passing it through a packed bed or fluidized bed vessel containing media selected from the group consisting of: granulated activated carbon, metal-organic frameworks, covalent organic frameworks, clays, polymeric sorbents, and combinations thereof thereby decreasing water-soluble organics:

(e) creating a first volume of pretreated water by sending the pre-treated water stream of step "d" to a pre-treatment water storage tank wherein the storage tank is fluidly connected to the packed bed or fluidized bed vessel;

(f) using OARO and/or VMD to treat a second volume of water from the pre-treatment water storage tank thereby further decreasing levels of total dissolved solids to less than 1000 ppm, and creating at least two output streams selected from the group consisting of: a first concentrated water stream, a second concentrated water stream, a first desalinated water stream, a second desalinated water stream, a first precipitated solids stream, a second precipitated solids stream, and combinations thereof with the proviso that at least VMD is used in the step "f", the second desalinated water stream further comprises water vapor having ammonia and volatile organics, wherein said water vapor is passed through a sorbent bed having a plurality of sorbents arranged in series to remove said ammonia and volatile organics.

25. An integrated process to treat produced water generated during oil and gas production, comprising the steps of:

(a) obtaining produced water from an oil and/or gas producing well, water transfer pipeline or salt-water disposal well, wherein the produced water includes: heavy metals, oil and grease, water soluble organics, colloidal and suspended solids, and 5,000 to 300,000 ppm of total dissolved solids;

(b) treating the produced water of step "a" by (i) adding an oxidizer selected from the group consisting of: oxygen, hydrogen peroxide, chlorine, bromine, bleach, $ClO_2$, peracetic acid, and combinations thereof; and/or (ii) treating the produced water of step "a" using at least one of the following: ozone, UV, hydroxyl free radicals, and combinations thereof;

(c) using a filtration system to treat the produced water of step "b" until the produced water satisfies each of the following plurality of specified treatment levels:

| | |
|---|---|
| heavy metals | less than 10 ppm, |
| oil and grease | less than 10 ppm, |
| water-soluble organics | less than 100 ppm, and |
| suspended solids | less than 50 ppm; |

(d) creating a pretreated water stream from the produced water of step "c" by passing it through a packed bed or fluidized bed vessel containing media selected from the group consisting of: granulated activated carbon, metal-organic frameworks, covalent organic frameworks, clays, polymeric sorbents, and combinations thereof thereby decreasing water-soluble organics:

(e) creating a first volume of pretreated water by sending the pre-treated water stream of step "d" to a pretreatment water storage tank wherein the storage tank is fluidly connected to the packed bed or fluidized bed vessel;

(f) using OARO and/or VMD to treat a second volume of water from the pre-treatment water storage tank thereby further decreasing levels of total dissolved solids to less than 1000 ppm, and creating at least two output streams selected from the group consisting of: a first concentrated water stream, a second concentrated water stream, a first desalinated water stream, a second desalinated water stream, a first precipitated solids stream, a second precipitated solids stream, and combinations thereof with the proviso that both OARO and VMD are used in the step "f", and the second desalinated water stream comprises desalinated water from the VMD used in the step "f" that is combined with the first desalinated water stream that comprises desalinated water from the OARO in the step "f" to generate a third stream of desalinated water with a reduced level of volatile compounds including organics and ammonia.

26. An integrated process to treat produced water generated during oil and gas production, comprising the steps of:

(a) obtaining produced water from an oil and/or gas producing well, water transfer pipeline or salt-water disposal well, wherein the produced water includes: heavy metals, oil and grease, water soluble organics, colloidal and suspended solids, and 5,000 to 300,000 ppm of total dissolved solids;

(b) treating the produced water of step "a" by (i) adding an oxidizer selected from the group consisting of: oxygen, hydrogen peroxide, chlorine, bromine, bleach, $ClO_2$, peracetic acid, and combinations thereof; and/or (ii) treating the produced water of step "a" using at least one of the following: ozone, UV, hydroxyl free radicals, and combinations thereof; (c) using a filtration system to treat the produced water of step "b" until the produced water satisfies each of the following plurality of specified treatment levels:

| | |
|---|---|
| heavy metals | less than 10 ppm, |
| oil and grease | less than 10 ppm, |
| water-soluble organics | less than 100 ppm, and |
| suspended solids | less than 50 ppm; |

(d) creating a pretreated water stream from the produced water of step "c" by passing it through a packed bed or fluidized bed vessel containing media selected from the group consisting of: granulated activated carbon, metal-organic frameworks, covalent organic frameworks, clays, polymeric sorbents, and combinations thereof thereby decreasing water-soluble organics;

(e) creating a first volume of pretreated water by sending the pre-treated water stream of step "d" to a pretreatment water storage tank wherein the storage tank is fluidly connected to the packed bed or fluidized bed vessel;

(f) using OARO and/or VMD to treat a second volume of water from the pre-treatment water storage tank thereby further decreasing levels of total dissolved solids to less than 1000 ppm, and creating at least two output streams selected from the group consisting of: a first concentrated water stream, a second concentrated water stream, a first desalinated water stream, a second desalinated water stream, a first precipitated solids stream, a second precipitated solids stream, and combinations thereof with the proviso that both OARO and VMD are used in the step "f", a generated stream of desalinated water from the VMD used in this step "f" is cooled to less than 40° C. using a heat exchanger, adjusting said cooled desalinated water to a pH in the range of 6.0 to 8.0 by feeding an acid or base through a feeding pump connected to the heat exchanger, and processing said desalinated water with the adjusted pH through a treatment selected from the group consisting of the OARO, an RO, and combinations thereof to generate a fourth stream of desalinated water with a reduced level of volatile compounds including organics and ammonia.

27. An integrated process to treat produced water generated during oil and gas production, comprising the steps of:

(a) obtaining produced water from an oil and/or gas producing well, water transfer pipeline or salt-water disposal well, wherein the produced water includes: heavy metals, oil and grease, water soluble organics, colloidal and suspended solids, and 5,000 to 300,000 ppm of total dissolved solids;

(b) treating the produced water of step "a" by (i) adding an oxidizer selected from the group consisting of: oxygen, hydrogen peroxide, chlorine, bromine, bleach, C10, peracetic acid, and combinations thereof; and/or (ii) treating the produced water of step "a" using at least one of the following: ozone, UV, hydroxyl free radicals, and combinations thereof;

(c) using a filtration system to treat the produced water of step "b" until the produced water satisfies each of the following plurality of specified treatment levels:

| | |
|---|---|
| heavy metals | less than 10 ppm, |
| oil and grease | less than 10 ppm, |
| water-soluble organics | less than 100 ppm, and |
| suspended solids | less than 50 ppm; |

(d) creating a pretreated water stream from the produced water of step "c" by passing it through a packed bed or fluidized bed vessel containing media selected from the group consisting of: granulated activated carbon, metal-organic frameworks, covalent organic frameworks, clays, polymeric sorbents, and combinations thereof thereby decreasing water-soluble organics;

(e) creating a first volume of pretreated water by sending the pre-treated water stream of step "d" to a pretreatment water storage tank wherein the storage tank is fluidly connected to the packed bed or fluidized bed vessel;

(f) using OARO and/or VMD to treat a second volume of water from the pre-treatment water storage tank thereby further decreasing levels of total dissolved solids to less than 1000 ppm, and creating at least two output streams selected from the group consisting of: a first concentrated water stream, a second concentrated water stream, a first desalinated water stream, a second desalinated water stream, a first precipitated solids stream, a second precipitated solids stream, and combinations thereof with the proviso that both OARO and VMD are used in the step "f", and the OARO and VMD used in the step "f" further comprises:

(i) first and second RO units, wherein the first RO unit has a first RO input and creates a first RO concentrate stream and a first RO permeate stream, and the second RO unit has a second RO input and creates a second RO concentrate stream and second RO permeate stream, (ii) wherein the second RO permeate stream is selectively fluidly connected to the first RO input and wherein the second RO concentrate stream is selectively fluidly connected to the second RO permeate stream, (iii) a VMD unit having a VMD input and creating a VMD concentrate stream and a VMD permeate stream, wherein (iv) the VMD permeate stream is selectively fluidly connected to both the VMD input and the first RO input.

28. The process of claim 27, wherein the first RO permeate stream is selectively fluidly connectable with the VMD permeate stream.

29. The process of claim 27, wherein the second RO concentrate stream has solids and these solids are treated with a treatment selected from the group consisting of: a filter, a centrifuge, a hydrocyclone, and combinations thereof.

* * * * *